(12) United States Patent
Liu et al.

(10) Patent No.: US 9,773,251 B2
(45) Date of Patent: Sep. 26, 2017

(54) APPARATUS AND SYSTEM FOR GENERATING VEHICLE USAGE MODEL

(71) Applicant: Ford Global Technologies, LLC, Dearborn, MI (US)

(72) Inventors: Yimin Liu, Ann Arbor, MI (US); Perry Robinson MacNeille, Lathrup Village, MI (US); Oleg Yurievitch Gusikhin, West Bloomfield, MI (US); Alfredo Cateriano, Novi, MI (US); Fei Wang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 14/294,333

(22) Filed: Jun. 3, 2014

(65) Prior Publication Data

US 2015/0348058 A1 Dec. 3, 2015

(51) Int. Cl.
*G06F 11/30* (2006.01)
*G06Q 40/00* (2012.01)
*G06Q 30/02* (2012.01)
*G07C 5/00* (2006.01)
*G07C 5/08* (2006.01)

(52) U.S. Cl.
CPC ..... *G06Q 30/0201* (2013.01); *G06Q 30/0251* (2013.01); *G07C 5/008* (2013.01); *G07C 5/0808* (2013.01)

(58) Field of Classification Search
USPC ............................................. 701/31.4; 705/4
See application file for complete search history.

(56) References Cited

U.S. PATENT DOCUMENTS

| 6,622,129 | B1 | 9/2003 | Whitworth | |
| 7,366,679 | B2* | 4/2008 | Yuyama | G06Q 30/0202 705/7.31 |
| 7,783,507 | B2* | 8/2010 | Schick | B61L 27/0094 705/7.11 |
| 8,321,245 | B2 | 11/2012 | Wallach et al. | |
| 2002/0032586 | A1* | 3/2002 | Joao | G06Q 40/02 705/4 |
| 2002/0177926 | A1* | 11/2002 | Lockwood | G06Q 10/20 701/1 |
| 2003/0046199 | A1* | 3/2003 | Murase | G06Q 10/10 705/35 |
| 2006/0265235 | A1* | 11/2006 | Schuchardt | G06Q 30/0645 705/307 |
| 2007/0083327 | A1* | 4/2007 | Brice | G06Q 10/00 701/410 |

(Continued)

*Primary Examiner* — Tyler Paige
(74) *Attorney, Agent, or Firm* — Jennifer M. Stec; Brooks Kushman P.C.

(57) ABSTRACT

A vehicle computer system configured to communicate with a mobile device, comprising a wireless transceiver configured to communicate with the mobile device. The vehicle computer system also includes a processor in communication with the wireless transceiver. The processor is configured to receive information from one or more vehicle sensors regarding vehicle usage, send the information to an off-board server via the wireless transceiver, wherein the information is utilized in a damages-model regarding the vehicle, and output the information concerning the damages-model to a user display.

18 Claims, 10 Drawing Sheets

(56) References Cited

U.S. PATENT DOCUMENTS

| | | | |
|---|---|---|---|
| 2007/0168217 A1* | 7/2007 | Weas | G06Q 10/06 705/307 |
| 2008/0255722 A1* | 10/2008 | McClellan | B60R 25/102 701/31.4 |
| 2009/0157522 A1* | 6/2009 | Srinivasan | G06Q 30/0601 705/26.1 |
| 2009/0271127 A1* | 10/2009 | Tsang | G07C 5/0816 702/34 |
| 2011/0112969 A1* | 5/2011 | Zaid | G06Q 10/02 705/50 |
| 2011/0208567 A9* | 8/2011 | Roddy | B61L 27/0094 705/7.41 |
| 2013/0018677 A1* | 1/2013 | Chevrette | G06Q 40/08 705/4 |
| 2013/0073112 A1* | 3/2013 | Phelan | G06Q 40/00 701/1 |
| 2013/0304276 A1* | 11/2013 | Flies | G06F 17/00 701/1 |
| 2014/0074345 A1* | 3/2014 | Gabay | G07C 5/08 701/31.4 |
| 2014/0156474 A1* | 6/2014 | Swain | G06Q 40/12 705/30 |
| 2015/0100508 A1* | 4/2015 | Binion | G06Q 10/06 705/313 |
| 2015/0161894 A1* | 6/2015 | Duncan | G08G 1/163 701/1 |
| 2015/0213420 A1* | 7/2015 | Krishnamurthy | G06Q 20/10 705/39 |
| 2015/0213519 A1* | 7/2015 | Krishnamurthy | G06Q 30/0283 705/35 |

* cited by examiner

Example 1 — Missing Part Exclusion

Term of lease (including extensions)          24 months
Mileage driven by customer                    37,254
Vehicle Condition Report
Carpet stain                                  $ 150
Hood scratch                                  $ 300
L/fender dent                                 $ 450
Missing stereo                                $ 300
                        Total                 $1,200

WearCare will waive $900. Additional $300 is to be collected from the customer. Missing stereo is not covered because the replacement cost is beyond the limit of the missing parts exclusion ($150 for Ford Credit contracts and $250 for Lincoln Automotive

Example 2 — Mileage Limitation

Term of lease (including extensions)          28 months
Mileage driven by customer                    61,324
Vehicle Condition Report
R/F door dent                                 $ 550
L/Qt panel dent                               $ 550
                        Total                 $1,100

WearCare will waive $550. Additional $550 should be collected from the customer. Only half of the total is covered because the customer exceeded an average of 25,000 miles per year (25,000/12 = 2083.3 miles per month max. 61,324/28 = 2190.1).

FIG. 8A

*Examples of What to Collect*

Example 3 — Multiple Incidents

| | |
|---|---|
| Term of lease (including extensions) | 36 months |
| Mileage driven by customer | 40,126 |
| Vehicle Condition Report | |
| L/fender dent ⎤ two incidents | $ 500 |
| R/ door dent ⎦ | $ 650 |
| Trunk scratches | $ 300 |
| Total | $1,450 |

WearCare will waive $1,450. Since the damage to the vehicle is less than $1,000 per incident, the full amount is waived.

Example 4 — $1000 per Incident Exclusion

| | |
|---|---|
| Term of lease (including extensions) | 36 months |
| Mileage driven by customer | 48,290 |
| Vehicle Condition Report | |
| L/fender dent ⎤ same incidents | $ 500 |
| L/ door dent ⎦ | $ 750 |
| Trunk scratches | $ 300 |
| Total | $1,550 |

WearCare waives $300 for trunk scratch but will not cover the left door and fender if damage appears to be from the same accident. The $1,250 ($500 + $750) should be collected from the customer.

Example 5 — Lease Extension

| | |
|---|---|
| Term of lease (including extensions) | 47 months |
| Mileage driven by customer | 40,977 |
| Vehicle Condition Report | |
| Cracked windshield | $ 225 |
| Cargo cover missing | $ 90 |
| CD cartridge missing | $ 75 |
| Total | $390 |

WearCare will waive $390. Although the customer extended the lease for 11 months, the coverage remains effective since the lease extension does not exceed the maximum allowable term of 60 months.

Example 6 — Maximum Coverage Limitation

| | |
|---|---|
| Term of lease (including extensions) | 36 months |
| Mileage driven by customer | 44,000 |
| Vehicle Condition Report | |
| R/driver door dent | $ 550 |
| R/fender dent ⎤ same incident | $ 300 |
| Trim missing ⎦ | $ 180 |
| Bumper damage | $ 785 |
| Broken windshield | $ 250 |
| L/Qt panel dent | $ 550 |
| Total | $2,615 |

WearCare will waive $2,500 for contracts dated 9-30-2011 and prior. Additional $115 should be collected from the customer. The total amount is not covered since the charges exceeded the maximum coverage amount of $2,500. Originations on or after 10-1-2011 WearCare will waive $2,615 for Ford ($4,000 max) and Lincoln customers ($7,500 max).

FIG. 8B

*Examples of What to Collect*

Example 7 — Term Restriction

| | |
|---|---|
| Term of lease (including extensions) | 66 months |
| Mileage driven by customer | 48,290 |
| Vehicle Condition Report | |
| Broken tail light | $ 120 |
| Burn hole in seat | $ 75 |
| Total | $195 |

WearCare coverage is void since the customer's lease extension exceeded the maximum allowable term of 60 months. The full $195 should be collected from the customer.

Example 8 — Driving Low on Oil

| | |
|---|---|
| Term of lease (including extensions) | 66 months |
| Mileage driven by customer | 48,290 |
| Vehicle Condition Report | |
| 1 qt low for 1000 miles @ $0.10/mile | $ 100 |
| 2 qt low for 20 miles @ $1.00/mile | $ 20 |
| Total | $120 |

WearCare coverage is void since the customer's lease extension exceeded the maximum allowable term of 60 months. The full $120 should be collected from the customer.

FIG. 8C

APPARATUS AND SYSTEM FOR GENERATING VEHICLE USAGE MODEL

TECHNICAL FIELD

The illustrative embodiments generally relate to a vehicle computer system that interacts with various sensors.

BACKGROUND

U.S. Pat. No. 8,036,788 discloses a system and method for monitoring the condition of a vehicle. The system and method includes a communication unit arranged to interface with a wireless communications network, at least one sensor for monitoring at least one component or subsystem of the vehicle and which is coupled to the communications unit, and a remote site connected to the wireless communications network and arranged to receive diagnostic or prognostic messages from the vehicle with the transmission initiated therefrom. A diagnostic module may be provided, included or coupled to the sensor(s) and directs the communications unit to transmit a message to the remote site upon determining an actual and/or potential failure of a component or subsystem.

Vehicle or loan companies, e.g. Ford Credit, may offer gap insurance and wear-care insurance to the retail and lease consumers. Vehicle companies may offer programs to reduce customer liability for potential excess wear and use charges at the end of a lease. When a dealership customer turns their vehicle in at the end of the lease, excessive wear on the vehicle may cause the company to charge customers a premium. Some programs, such as Ford Motor Credit's WearCare program, gives customers greater control over potential lease-end charges for vehicle wear and tear that may occur beyond normal everyday use, which includes dents, scratches, paint damage, carpet stains and tire wear (tire tread depth). WearCare provides for a waiver of a certain dollar amount of liability in chargeable damages related to excess vehicle wear and use. WearCare is available for a monthly rate on certain leases. There is no lessee deductible, and WearCare may be canceled by the customer at any time during the original term of the lease.

For those profitable leasing and insurance programs, it may become important to estimate the residual value of vehicles more precisely, especially for luxury vehicles. Besides marketing information (e.g. demand for used vehicles and supply, economy), prediction of the condition of the leased vehicle fleet at lease termination is critical to anticipate vehicle residual values. Automakers currently use end of lease third party inspection to determine the excess wear & use, and then determine the residual value of a vehicle after leasing at the beginning of the leasing in the leasing contracts. The lessor absorbs most of the risk due to wear and tear, whereas the OEM assumes the risk of changing markets for used vehicles. However, the means of inspection are to some degree arbitrary and based only on vehicle condition that can be readily observed. Therefore the inspection may lack credibility for some customers.

Understanding the vehicle condition precisely at the end of the lease could help determine the residual value of the vehicle after leasing, understand the insurance to know for a potential payment due to the wear and tear of a vehicle during a lease, determine monthly premiums based on the customer history, driving behaviors, road conditions, weather conditions, maintenance performed, and vehicle conditions. This may also allow a party to offer different lease pricing dynamically for the term of the lease. Customers may also be able to determine if they can use "Wear Care" or gap insurance. Other embodiments may also support variable rate property insurance with a savings component and analysis of sinking funds intended to replace vehicles at end of life. Automakers may also develop a vehicle strategy to determine an ideal demographics to offer the leasing and insurance products, and retain the customers to lease again even before the leasing is ending (identify who should be involved in an early-bird program). Additionally, when vehicles are completed from their lease period, they may become a CPO (certified pre-owned vehicles). Automakers can identify the value (price) of individual CPO vehicles based on usage.

SUMMARY

A first illustrative embodiment includes a vehicle computer system configured to communicate with a mobile device, comprising a wireless transceiver configured to communicate with the mobile device. The vehicle computer system also includes a processor in communication with the wireless transceiver. The processor is configured to receive information from one or more vehicle sensors regarding vehicle usage, send the information to an off-board server via the wireless transceiver, wherein the information is utilized in a damages-model regarding the vehicle, and output the information concerning the damages-model to a user display. A second illustrative embodiment includes a vehicle computer system (VCS)

A second illustrative embodiment a server in communication with a vehicle, comprising a wireless transceiver in communication with a vehicle that is configured to exchange data. The server also includes a processor in communication with the wireless transceiver. The processor is configured to receive vehicle data from the vehicle that includes information regarding vehicle usage, receive vehicle environment data from an off-board server, aggregate the vehicle data and vehicle environment data and determine a vehicle's depreciation value based on the aggregated data, and transmit the vehicle's depreciation value to a vehicle owner.

A third illustrative embodiment includes a computer-implemented method. The method includes communicating with a mobile device located in a vehicle via a wireless transceiver, receiving information from one or more vehicle sensors regarding vehicle usage via the mobile device, determining a depreciation-value of the vehicle based on at least the information received from the one or more vehicle sensors; and sending the depreciation-value of the vehicle to a user via the wireless transceiver.

BRIEF DESCRIPTION OF THE DRAWINGS

FIG. 8A are a first set of tables that include data relevant to the damages model and/or vehicle value.

FIG. 8B are a second set of tables that include data relevant to the damages model and/or vehicle value.

FIG. 8C are a third set of tables that include data relevant to the damages model and/or vehicle value.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
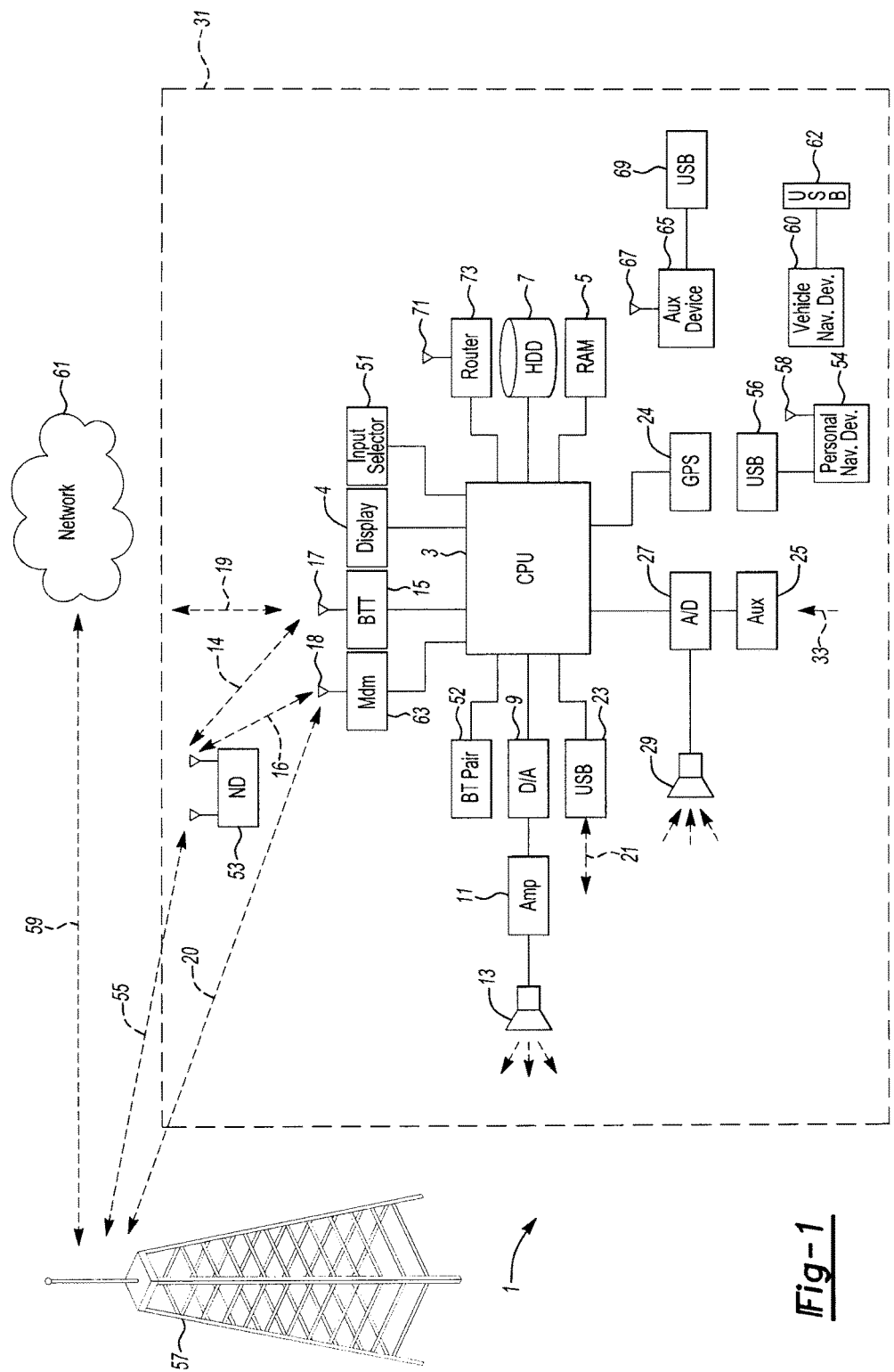
FIG. 1 illustrates an example block topology for a vehicle based computing system (VCS) for a vehicle.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point, DSCRC (IEEE 802.11p for lower layers and IEEE 1609 for the upper layers). SAE J2735 may be used as the Dedicated Short Range Communications (DSRC) Message Set Dictionary.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11 ac network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is cap able of performing the exemplary processes.

Figure 2:
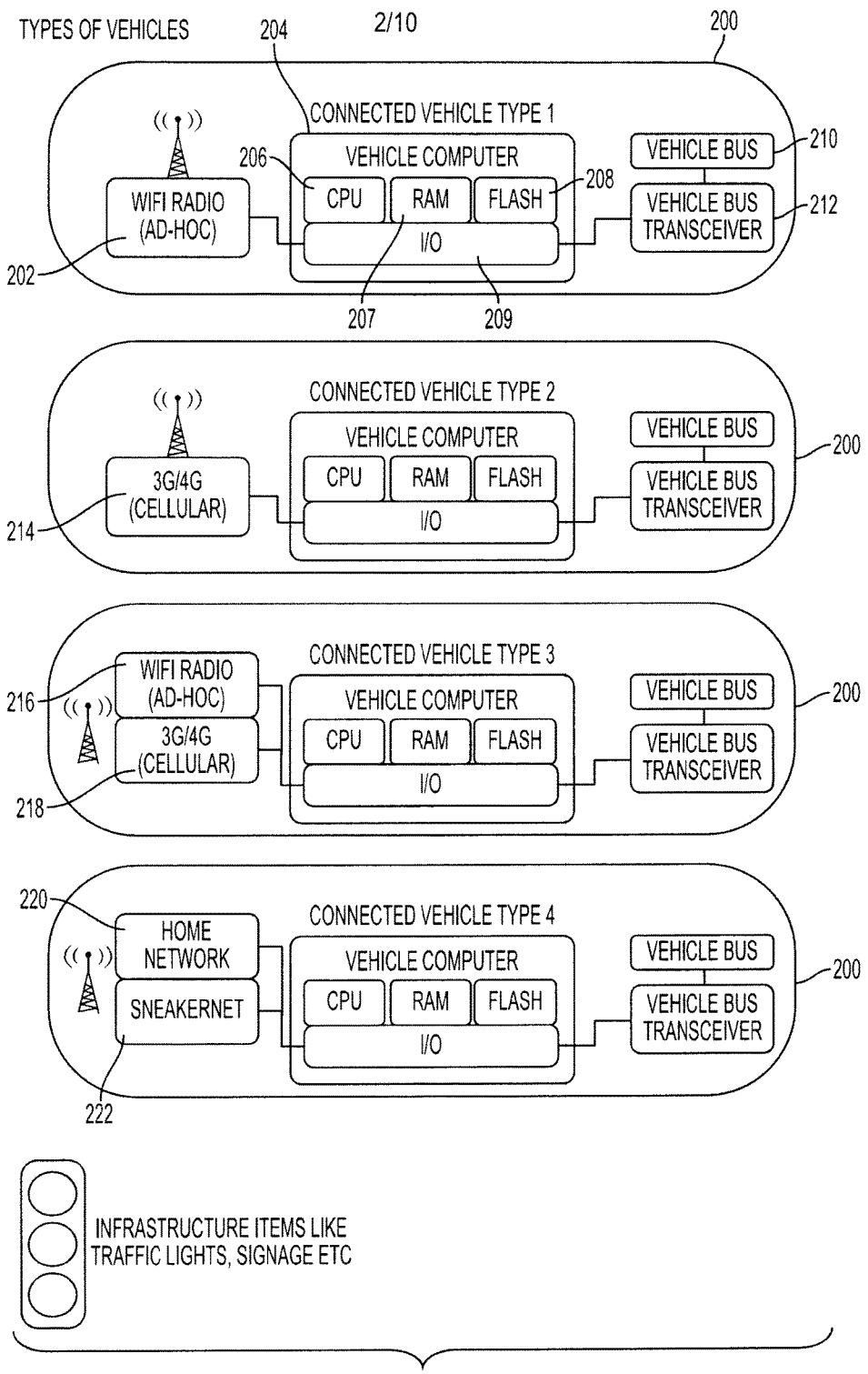
FIG. 2 illustrates an example of the different vehicles that may interact with an embodiment.

FIG. 2 illustrates an example of the different vehicles that may interact with an embodiment. A vehicle 200 may consist of different vehicle computer system configurations that may interact with the various embodiments of the present invention. For example, one vehicle may include a Wi-Fi radio 202. The WiFi radio may include all devices under IEEE 802.11-2012. This may also include dedicated short-range communications (DSRC) which may be utilized for vehicle-2-vehicle communication and vehicle-2-roadside communication. Some of the road-side communication device may include infrastructure items like traffic lights, signage, etc. The Wi-Fi radio may be utilized to interact with off-board servers or devices to communicate information. For example, a Wi-Fi radio 202 may be utilized to collect traffic information from an off-board server. In another example, the Wi-Fi radio may be utilized to send vehicle data to an off-board device.

The WiFi radio 202 may be connected to a vehicle computer that includes a CPU 206, random access memory 207, flash memory 208, and an input/output controller 209. The vehicle computer may be utilized to process data collected from the WiFi radio and a vehicle bus transceiver 212. The vehicle computer may be utilized to save or store data in either RAM 207 or flash 208.

The vehicle bus transceiver 212 may be utilized to facilitate communication of the vehicle computer to other vehicle sensors or transceivers on the vehicle bus 210. Some examples of vehicle sensors/transceivers on the vehicle bus 210 may include the brake ECU, engine ECU, tire pressure monitor sensor, seat sensor, GPS module, etc. Other examples of sensor data that is collected could include acceleration, sound, temperature, road gradient, speed, brake, brake speed, and parking place. The data and information collected from the various modules that communicate on the vehicle bus may be utilized by the vehicle computer.

Other vehicle configurations may include a vehicle with other alternative connections to the off-board servers or devices. For example, the vehicle may be equipped with a cellular modem 214 to communicate data via a 3G/4G connection. In another embodiment the vehicle may include a hybrid approach that includes both a WiFi radio 216 to communicate with an ad-hoc network and a cellular modem 218. In yet another example, the vehicle may include a transceiver to communicate with a home network 220 or similar network that utilizes a sneaker net 222 that includes physical media such as magnetic tape, floppy disks, compact discs, USB flash drives, external hard drives, etc.

Digital radios may also be part of the vehicle in communication with the vehicle computer, although not required. The digital radios may also be carried in mobile devices, such as smart phones. The mobile devices may be incorporated in the vehicle network and the content delivery system.

Figure 3:
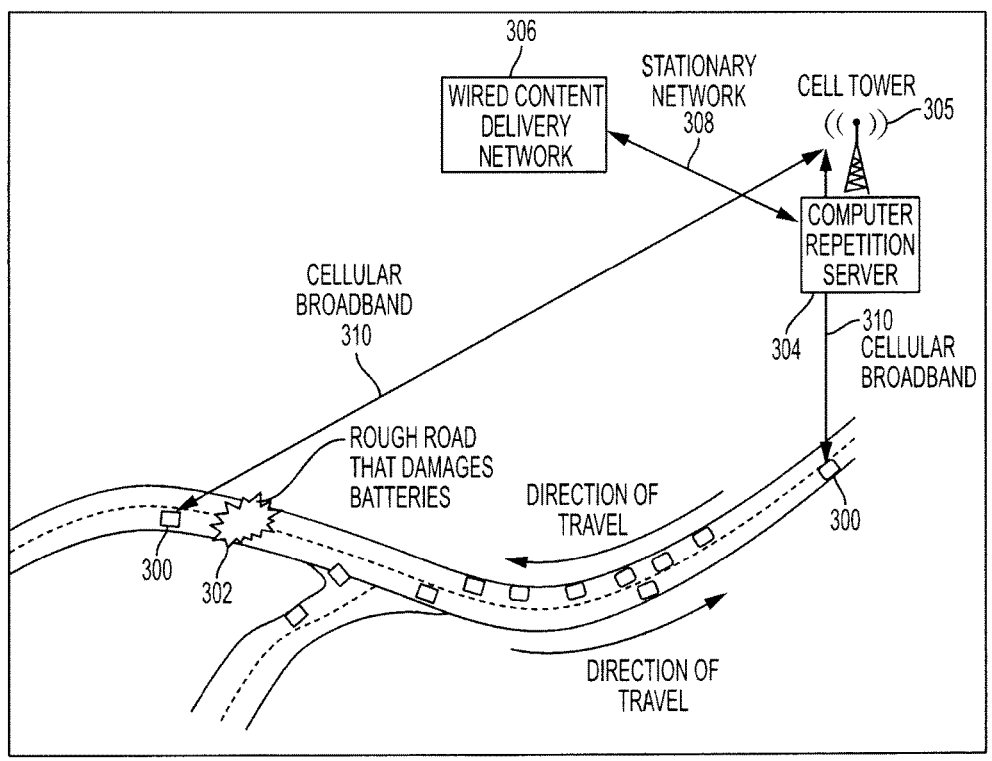
FIG. 3 illustrates an example data of the vehicle network interacting within an infrastructure system.

FIG. 3 is an example of a vehicle on the road interacting with a communication infrastructure. Vehicles 300 may be driving along a road, freeway, or highway. Upon a vehicle 300 that is near a location of interest (LOI) 302, vehicle sensors may collect information regarding the LOI. For example, various vehicle body sensors may include information about the type of damage done by a pot-hole along the road. The damage may be over multiple vehicle parts, such as the suspension, tires, rim, battery, etc.

It may be necessary to discover a LOI, which is a relatively rare occurrence. In the traffic stream on this road one car per hour is loaded with a software application that detects surface roughness, but is limited in accuracy to use less vehicle system resources. One of the vehicles equipped with the software detects the roughness and signals other vehicles and infrastructure access points in the vicinity to form an ad-hoc computer.

An ad-hoc computer forms in the vicinity of the LOI that will implement algorithms to compute the boundaries of LOI and the 2D power spectrum of the road in that area that may be tracked through time. Membership, network topology, and data storage for the ad-hoc computer may be implemented using mobile middleware software such as LINDA in a mobile environment (LIME) or Java JINI. Vehicles are able to join and exit the ad-hoc computer as they move towards and away from the LOI. Application software in the CDN for determining and tracking surface roughness percolates to the ad-hoc computer where it remains as long as tracking is necessary The vehicle may communicate this information to a wired content delivery network 306 utilizing a cellular broadband 310 channel. The cellular broad band channel may utilize a cell tower 305 that utilizes a computer repetition server 304 to generate and transmit various information over the cellular broadband channel. In alternative embodiments, other methods may be implemented to communicate data over a long-range transceiver.

The cellular tower 305 that is in communication with the computer repetition server 304 may communicate with the wired content delivery network 306 via a stationary network 308. The wired content delivery network may collect the information regarding various areas 302 that may affect vehicle wear and tear. The wired content delivery network 306 may send the data to other vehicles 300 or broadcast to another data center for utilization of the data.

Figure 4:
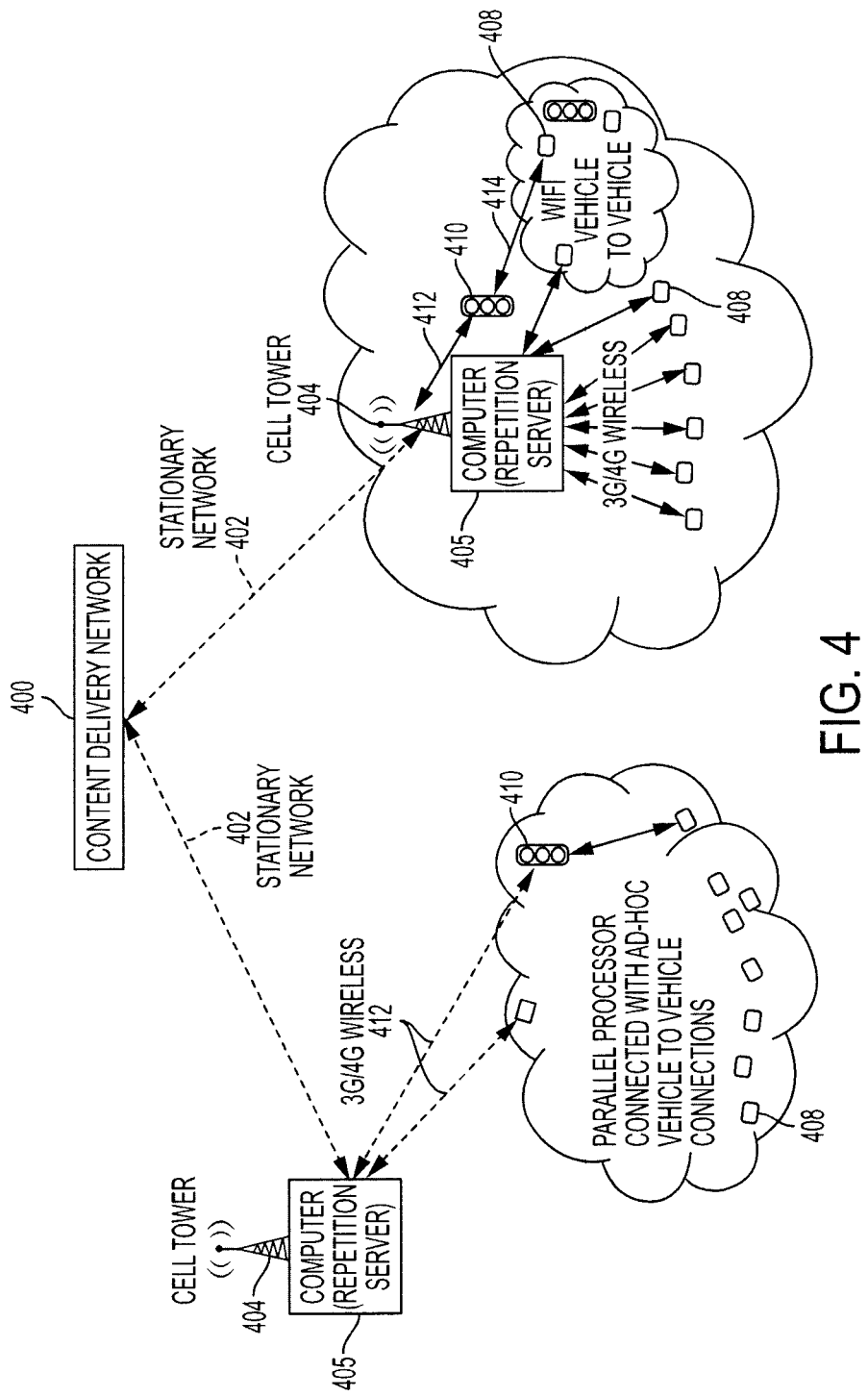
FIG. 4 illustrates an embodiment of an ad-hoc computing topology utilizing the vehicle and content delivery network.

FIG. 4 is an example of an ad-hoc computing topology utilizing the content delivery network, vehicles, and other infrastructure pieces. Ad-hoc parallel computers may be formed dynamically rom vehicles, cell towers, and other infrastructure items like traffic lights with embedded computers and repetitions servers in the content delivery network. Damage models may compute the cost of different events from vehicle network signals that may run in the vehicle system for improved access to input data. In another example, the damage models may interact in the cloud, possibly under Apache Hadoop control (an embodiment of an open-source software framework for starge and large-scale processing of data-sets on clusters of commodity hardware) for larger processing power. The processing will produce results that will initially be left in place in the content delivery network, but may migrate to places where they are used for analytics. Data may be managed in the content delivery network by a product such as Apache Torque. The ad-hoc parallel computing system may make configurations that change dynamically as the distance between vehicles and cell towers change. The data may be shared using mobile middleware such as Java Jini or LIME (LINDA a Mobile Environment).

The vehicles may be in a specific location to form ad-hoc parallel processing cells using digital short range communication (DSRC, WiFI) and cellular Broadband (GSM/3G/4G) to communicate with each other and with the infrastructure. The system may be able to detect how much the distance of the vehicle is to another vehicle ahead in the network, and also calculate the driving speed and braking pattern. The cells may provide the second tier of processing after each individual vehicle. The vehicles may participate in more than one cell to allow an exchange of processed data between the cells. The system may then be able to provide more detailed information of the consumer's driving behaviors.

The ad-hoc computers may serve to sample the data and reduce data size by utilizing specific mathematical models. The accuracy of the models and the optimal sampling rate are determined so that the sampling rate may be reduced to the minimum that is necessary.

The content delivery network 400 may be in communication with vehicles 408 and infrastructure items 410 via a cellular network 412 that utilizes a cell tower 404 in communication with a computer repetition server 405. The content delivery network 400 may communicate with the cellular network 412 may include the various types of networks (3G, 4G, LTE, etc.). The infrastructure items 410 may communicate with vehicles via a wireless network 414 as well. In addition, vehicles may communicate with each other or with the insurance company to distribute data to/from the content delivery network.

Figure 5:
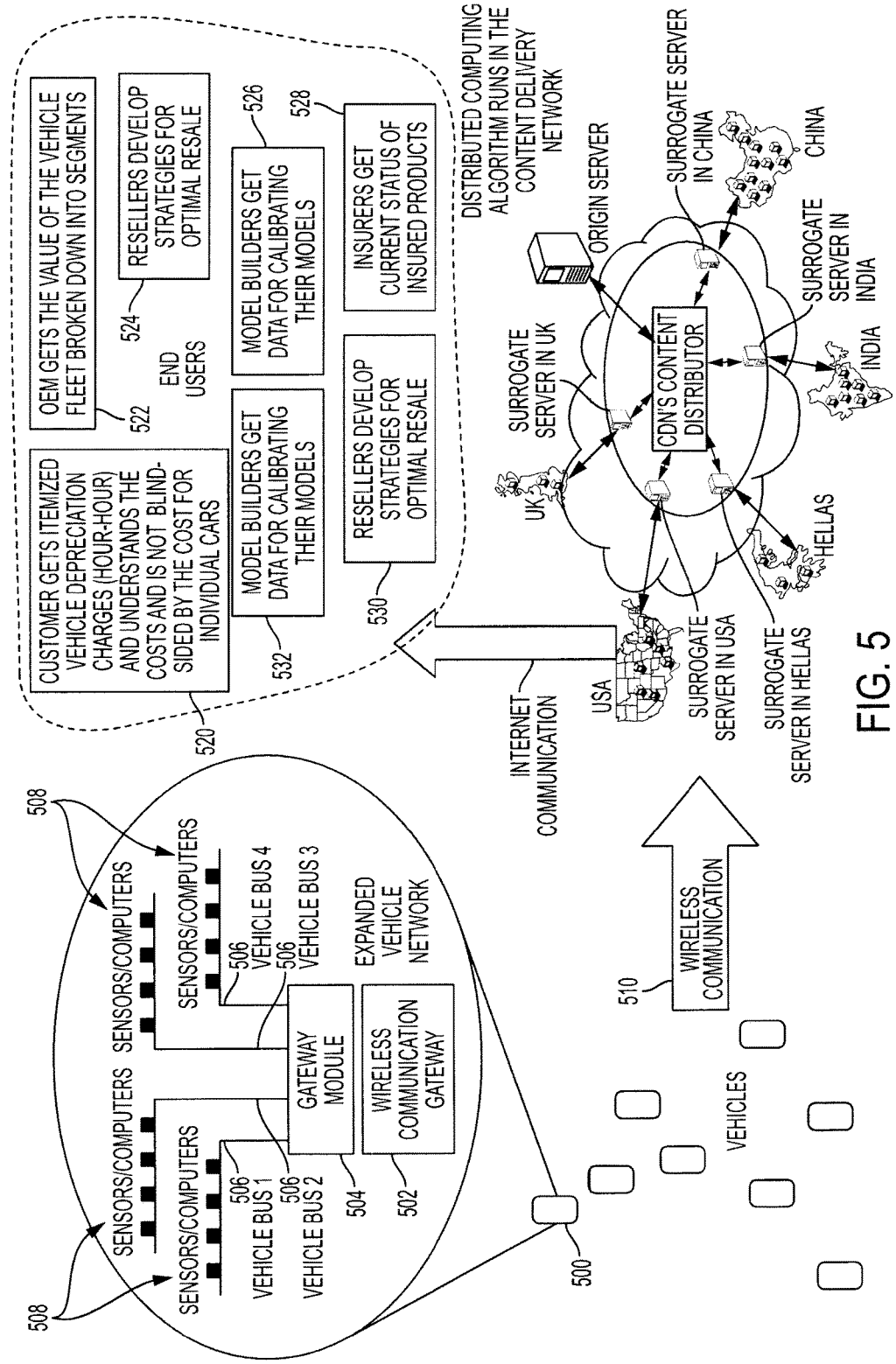
FIG. 5 illustrates various vehicle sensors interacting with the vehicle computer system to communicate vehicle data across a content delivery network.

FIG. 5 illustrates various vehicle sensors interacting with the vehicle computer system to communicate vehicle data across a content delivery network. The vehicle 500 may include various sensors/computer/control units 508 that communicate information to one another on the vehicle bus 506. The vehicle bus may utilize CAN (Controller Area Network) communication bus. Data collected by the various sensors 508 is shared via the bus. Additionally, various computers and sensors 508 may also be capable of communication with each other via the vehicle bus 506.

A vehicle gateway module 504 may be in communication with or part of the vehicle computer system. The vehicle gateway module 504 may allow external devices to communicate with the vehicle computer system or vehicle sensors 508 via the vehicle bus 506. The vehicle gateway module may include various external ports (USB, HDMI, SD Card, etc) to retrieve or send data. The gateway module 504 may also communicate via wireless transceivers (e.g. Bluetooth, Wi-Fi, WiMax, RFID, etc.) The gateway module 504 may also be utilized to send user's information related to the damages-model calculated, thus indicating the vehicle's value. The gateway module 504 may also be able to communicate with a wireless communication gateway 502. The wireless communication gateway 502 may be able to communicate with a device (e.g. mobile phone, tablet, cellular modem, etc.) to send data, or may include a transceiver (e.g. modem) to send data directly to a remote server. The wireless communication gateway 502 may be utilized to send off-board data from a remote server, such as the content delivery network, via wireless communication 510. The wireless communication gateway 502 may also receive off-board data to distribute to the gateway module 504 to share on the vehicle BUS 506 to various sensors/computers 508.

The end users may receive various data/information in a varying amount of fashion based on the vehicle data and dynamic data. For example, the content delivery network may send the data to the users via an internet connection. The users may be more than just a vehicle driver, but may include the auto manufacturer, insurance agency/firm/company, reseller, potential customer, reseller, model builder, supplier, etc. In one example, the customer may receive depreciation data 520 from the content delivery network. The customer may receive itemized vehicle depreciation charges (hour by hour basis) or feedback and understand the costs associated with certain usage. Such upfront costs may allow a customer to understand why certain charges are available at the end of lease and give the customer some suggestions on what they can do better.

In another example, the end user may include the automotive manufacturer. The automotive manufacturer may receive the costs associated with the value of certain fleet vehicles 522. The vehicle segment may be broken down for each associated fleet. The automotive manufacturer can then understand how certain lease vehicles are depreciating on wear-and-tear for certain fleet customers or customers.

In another embodiment, the end user may be a reseller. The reseller may utilize the data to develop and calculate strategies for optimal resale 524 and 530. For example, the reseller may understand what discounts to utilize to provide greater discounts for vehicle usage. Additionally, the reseller may understand target demographics to sell a particular vehicle based on the vehicle data received. For example, one driver may drive the vehicle slowly once a week for a short errand. This type of driving can cause moisture to accumulate in the oil and engine wear due to gumming and loss of lubricity. However, this driving style may also cause very little brake wear. Another driver may drive the vehicle long distances on urban roads where the engine oil does not gum and retains its lubricity, but the brakes wear out. The second driver is better off buying a used car from the first driver whose driving style is complementary than buying from another driver with the same driving style. The car will last longer with fewer repairs because the driving styles wear the cars in different ways. A reseller may use the data generated by this invention to identify buyers whose driving styles are complementary with the seller's style and therefore will be willing to pay more for the car, hopefully increasing the reseller's profit and the vehicles' residual value. A second example would be complementary geographies. The paint on a car that has been used in Florida is damaged by sun and salt air where this type of damage takes place rapidly even if it is not visible in the early stages. On the other hand, the kind of damage that results from driving on snow covered roads does not exist in Florida. All things being equal, the Florida car may get a higher price in the Midwest where the sun is low and there is no salt air, but there is snow on the road in the winter.

In addition, many model builders may receive data for calibrating certain models 526 and 532. Model builders get data for their models 526: time to failure models can be built that estimate the statistical life expectancy of vehicle components given the usage data collected by the invention. These models can be calibrated using information about actual time to failure from repair shop information. By making changes in the components the models can be evolved to determine what sorts of design changes will improve component life for a vehicle park. These combined with weight and cost analysis can be used to balance component cost with warrantee and repair costs. They can also be used to estimate future maintenance costs of a vehicle given a particular driver and in a particular place and time. The driver and place are known from data collected by the invention. Model builders may combine data for their models 523. Combining data generated by the invention with resale value can help modelers establish the relationship between individual vehicle usage history and current expected resale value given the pool of known prospective buyers and future usage patterns. Models may also be implemented to estimate the likelihood and cause of catastrophic failure of vehicle components that could/have led to inconvenience, property damage, injury or death. In another example, an insurer may receive an example of the status of current products that are insured 528. For example, the vehicle data may be sent to a server for processing. Once processed, the data may be sent to an insurer to show various residual of the vehicle. The insurer may adjust the rates of the vehicle or other product to offer discounts or increase premiums. Additionally, the insurance provider can offer specific types of products for certain customers and recommend different plans to certain customers. In one example, certain insurance coverage may be more cost-beneficial to a customer than their current plan.

Figure 6:
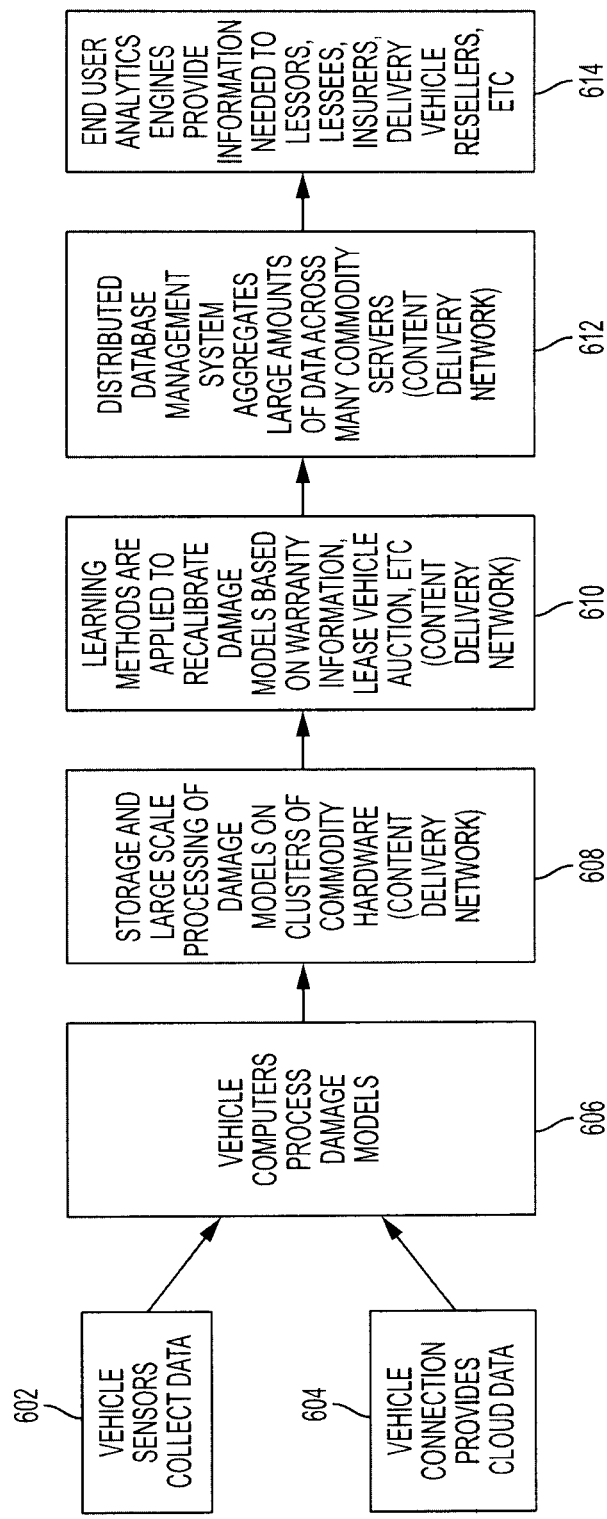
FIG. 6 illustrates an example flow chart of an embodiment that may collect and process sensor data.

FIG. 6 illustrates an example flow chart of an embodiment that may collect and process sensor data. The vehicle sensors 602 may collect data for use with a vehicle processor or vehicle computer system. The sensor data may include acceleration, sound, temperature, road gradient, speed, brake, brake speed, and parking lace. It may also extract features from the data using sampling techniques such as filtering an integral transforms. Additionally, it may be able to extract road conditions and parking features such as dirt road, pothole, bottom out, suspension overload, weather, the hours the vehicle was parked outside, etc. Features may be located and time stamped using data from the positioning system. The system could then apply analytics to determine vehicle conditions. There may be vehicles with different computational abilities in the ad-hoc computer as shown in the FIG. 2.

The vehicle connection to an off-board server may also provide cloud data as well 604. The vehicle connection may be through an on-board cellular modem or through a nomadic device that may utilize Bluetooth to communicate with the vehicle computer system. Off-board information that the vehicle may use include, but are not limited to, weather information such as ambient temperature, barometric pressure, humidity, rain, traffic information, etc.

The vehicle computers may process damage models 606 utilizing the aggregate data that is collected by the vehicle sensors and the vehicle connection. Additional sensors, such as stress sensors and vibration sensors may be added simply to track the vehicle life and cost. Various models may be utilizing to evaluate the estimate of wear and tear or performance degradation of the vehicle as a whole, or for specific vehicle parts. Some examples various use cases utilizing various damages models of the invention are listed below:

A table/handbook may provide input to the damages model or vehicle value. The table/handbook used by various companies or agencies may provide the input for a damages model. The table/handbook may include information that is currently used or checked by leasing companies to decide the deductions, by the insurance company to identify the damage costs. Various examples are shown in FIG. 8A, FIG. 8B, and FIG. 8C.

One part of damage models is to classify various incidences into several pre-specified event groups, so that the cost estimation is easier and more efficient from the reduced number of event groups. Based on collected characteristics of events, we adopt support vector machine to classify events according to $\min|\beta|$, subject to $$\begin{cases} y_i(x_i^T \beta + \beta_0) \geq 1 - \epsilon_i \\ \epsilon_i \geq 0, \sum \epsilon_i \leq \text{constant} \end{cases},$$

where $x_i$ and $y_i$ respectively represent event characteristics and event groups. The second part of a damage models may include a reliability model For example there can be a damage model for failing to change the oil. Many vehicles have a smart oil light that uses several factors such as the miles driven and the average trip length to inform the driver/owner of the vehicle when the oil should be changed. When the light is off the driver is not accessed for oil damage, but when the light is on the rate of oil damage ($D_{rm}$) may take the form of a Weibull cumulative distribution function where miles driven since the light came on is x:

$$D_{rm}1-e^{-(\alpha/\lambda)^k}$$

In the equation λ and κ are determined by regression using repair histories and auction prices of many vehicles in which data has been collected by this invention. The charge to the customer or to the insurer is given by:

$$\text{Charge}=D_{rm}*x$$

For damage that may be related to time rather than distance, (e.g. exposure of paint to sunlight) x may be time rather than distance. Further, damage models may exist that are based on mixed inputs such as distance and time, or time and light intensity, or any other vehicle or environment data, etc. . . .

In one embodiment, the vehicle may collect road condition/parking condition data and the information of driving behaviors. From the data, the system could predict the vehicle condition, and related vehicle residual value that is influenced by vehicle condition, and identify the different consumer groups to offer various insurance products and/or charge a different leasing price. The system could provide much more accurate prediction of vehicle physical condition, which may significantly impact vehicle residual values and related insurance products.

In another embodiment, the electronic stability control and restraint control module may have accelerometers that can detect sudden shocks, such as hitting a pothole or a curb, that can damage a vehicle and reduce its life in ways that are not apparent by simple observation. A model may estimate the effect of the vehicle residual value based on the data collected from these sensors.

In an additional embodiment, the brake pressure sensor may measure the pressure and duration of each braking event. The brake temperature sensor measures the heat produced during braking. The GPS clock determines when and where a braking event occurs. The ambient temperature, barometric pressure, humidity, rain, solar radiation sensors measure the ambient air condition. The antilock braking system may report when ABS is needed. The wheel height sensors may determine the vehicle weight and weight shift during braking. A brake performance model can estimate the amount of brake pad and rotor (or drum and lining for drum brakes) wear for each braking event using these inputs. The events are logged and the wear of brake components is estimated.

In yet another embodiment, tire wear can be estimated from various vehicle sensor inputs. Wheel torque sensors and longitudinal, lateral and yaw acceleration sensors are input into a model to determine the force vectors acting on each of the four wheels. Road map databases contain information about the road construction relevant to tire wear, and weather information sensors and weather reports from the Internet provide information about ambient conditions. These are inputs into a tire wear model that estimates how much life is left in the tires, and projects the total wear when the vehicle is returned.

Additionally, timing belt life may be estimated from the factors that influence timing belt wear: 1) starting the engine when the belt is cold; 2) engine acceleration; 3) contamination with oil or coolant. Contamination with coolant may be difficult to detect without a special sensor, but can be suspected if engine oil drops continuously between changes and top-ups. An important factor for timing belt wear is quickly accelerating the engine (which loads the belt) to high speed (while flexes the belt more quickly) while the belt is cold (and therefore inflexible). The belt may get cold when the ambient temperature is low, which is detected by the ambient temperature sensor used for climate control and engine calibration, and warms as it is used. The speed of the engine is detected by the engine tachometer and the acceleration of the engine by the time derivative of the engine speed. All of these inputs can be used to estimate timing belt wear.

Engine bearing life can be greatly reduced by loss of oil pressure, especially when they are cold or operating under high torque. Generally vehicles have an oil pressure sensor and an estimate of engine torque on their system bus. These can be used as inputs to a bearing wear model that may detect low oil pressure events and estimate the damage they may cause.

Another embodiment may determine damage from a flooded vehicle. Vehicles that have been flooded may have permanent damage that may be difficult to detect in inspection. Low voltage devices, such as sensors and computers, get soaked and a long process of deterioration begins. Various connections may never recover. Water may enter the engine intake and flood the cylinders, and also begin rusting and bending engine components. Water mixed with engine or transmission oil will reduce the life of those components. Water sensors can be installed in various locations, such as wheel speed sensors, that will detect the presence of flooding that does not cause catastrophic damage requiring repair, but does cause long term degradation of mechanical parts and electronics.

In another embodiment, the engine control computer may collect input from many sensors in the engine, transmission, and exhaust system that it uses to determine the type of gas being used in the engine and what are its properties for engine calibration. For example, when the engine is run on E85 the calibration is considerably different than when the engine id run on pure gasoline. By determining the type of gas, engine parameters such as spark advance and air-fuel mixture, can be adjusted to hit fuel economy and emissions targets. The type of fuel used also influences vehicle life that may depend on ambient and driving conditions. This data can be collected from the vehicle bus and input into an engine life model to estimate wear and tear on the engine.

Transmission damage may be determined due to monitoring the status between shifting between reverse gear and forward gear without coming to a complete stop. This can happen during rocking of the vehicle to get out of snow and mud, or just from carelessness when backing out of parking spaces, etc. It reduces the life of the transmission significantly by increasing band wear and fatiguing transmission parts. It can be detected by monitoring the PRNDL and wheel speed of the vehicle, detecting whether the wheels have stopped before the switching the PRNDL. These types of events may be logged. If only a few such events it would be considered normal wear and tear. Enough of these events and the estimated value of the vehicle predicted by the models may decline.

Rev protection may be monitored as well. Most vehicles have over-rev protection that prevents the driver from taking the engine above the "red-line" RPM where the engine would be damaged. Never-the-less taking the engine to high revs when it is cold, hot, or during the break-in period can reduce the engine's life. With a manual transmission, it is easy to over-rev by shifting too late or pushing the accelerator while the clutch is disengaged or the transmission is in neutral. With an automatic transmission, the shift schedule normally prevents over-revving, but it can still happen if the vehicle is in neutral or park and the accelerator is pushed down. To determine the cost of this type of damage, a simple model can be employed that combine engine temperature, RPM, and the odometer to determine break-in period.

All-wheel drive over-heating may be monitored. All-wheel drive over-heating may occur when there is a large difference in the speeds of the four wheels for an extended time. This may occur when the vehicle is stuck in mud with one wheel spinning. For example, traction control may be off and the driver may rev the engine. The all-wheel drive may have a temperature sensor, but the damage can also be estimated by logging the wheel speeds when the traction control is off, and applying a damage model to the wheel speeds.

Driving with parking/emergency brake on is a common cause of excessive brake wear due to friction and heat. The purpose of this brake is to provide braking when other systems fail, so it is independent of the normal braking system (a vehicle may have a mechanical rather than hydraulic linkage to the rear brakes). Because it is intended to bypass normal braking systems, there are no protections against engaging the brake while the vehicle is moving. Even though there are warning devices and the car's performance is reduced if such an event occurs, the brake pads (or shoes), the rotor (or drum) may be damaged. In some cases, the calipers (or cylinders) may be damaged. The existence of this condition may be determined by a switch in the parking gear assembly that indicates the parking brake is applied and when the vehicle speed sensor determines that the vehicle is moving. The damage done by driving with the brake set may be determined from the brake temperature sensor and the odometer. A simple damage model can be used to determine how much brake damage has been caused by the temperature and distance the brake dragging has occurred.

Thermal distortion of the brake rotor may also be detected through various vehicle sensors, such as utilizing the data from the brake ECU, precipitation/wind-shield wiper sensors (to detect moisture), vehicle speed, etc. This may be the result of quenching a hot brake rotor by emersion in water. This can happen when applying the brake down a hill and driving through a puddle or by a hard brake application followed by a car wash. The quenching of the rotor can be detected from a sudden temperature reduction of a hot brake. After the brake rotor is distorted, the brakes typically pulse. The pulsing occurs when the brakes are applied and result in a fluctuation of the brake pressure synchronized with change in brake torque and wheel position. These three inputs can be correlated to determine synchronicity and determine the extent of the warping.

Suspension damage may also be detected via various sensors including the vehicle gyro, brake ECU, etc. Suspension modifications that a driver may make to improve performance or replace damaged parts may actually damage suspension parts and invalidate warrantees. These changes may include adding high-performance tires, stiffer shock absorbers, stiffer springs, stiffer roll bars, etc. Generally cornering performance is improved using stiffer components, but at the expense of greater loads on suspension components and more vibration. These tend to fatigue metal components and wear rubber dampers at an accelerated rate.

If the lessor or owner of a vehicle alters the suspension in this way, the relationship between steering angle and speed to yaw rate, roll rate, lateral and longitudinal acceleration will change. A model that compares steering angle and vehicle speed with yaw, roll rates and accelerations can be trained to recognize normal vehicle equipment as it changes over time. Sudden changes in the relationships indicate either equipment failure or substitution of out-of-spec components. If the condition continues the vehicle will be damaged beyond normal wear and tear. The design life of suspension parts, frame materials, spot welds, battery, etc. will be reduced.

Possible glass damage caused by impacts such as gravel from the road can be detected using the vehicle's microphone. Glass impacts have a much larger spectral range and characteristic time dimension that makes them distinguishable from other types of noise the speech recognition microphone normally detects. The intensity of the signal is generally proportional to the energy of the impact. A damage model of the energy of the impact(s) can determine the likelihood a sound event is an impact that has damaged the glass. A time log of the impacts would give an estimate of the likelihood the glass will need to be replaced when a lease vehicle is returned. Actual glass damage cannot be determined without inspection, but the likelihood of damage would still provide an estimate of the condition of the vehicle when it is returned.

The vehicle computer system may utilize vehicle sensors to detect any damage resulting in an automobile accident. The restraints control module is used to trigger an airbag deployment when a severe accident is detected. Accidents that do not trigger the airbags but diminish the residual value of the car may also be detected through gyroscope, vehicle speed sensors (e.g. detect sudden deceleration), etc. Such accidents can be logged and would indicate damage from "fender benders" that do not trigger an airbag deployment and leave the vehicle operational. An inspector may be notified from a remote-server via e-mail, message, etc utilizing various embodiments of the invention. The inspector may then look for these collisions when observing the leased vehicle when it is returned. If the inspector notes that the damage has been repaired, he may monitor such data. The inspector may also note any damage that has not been repaired.

Damage from towing may be assessed through various vehicle sensors. There are many variations to assess the damage from a vehicle that has been towed. Towing can be detected when the GPS indicates the vehicle is moving and the vehicle can detect that the engine is turned off or when the vehicle has moved while the vehicle was powered off. Semiconductor technology (as previously described) may allow the vehicle electronics to monitor the vehicle while it is powered off. If the rear wheels are turning and the front wheel are not, then the vehicle may be towed with either a dolly in front or a sling belt. Towing with a tow sling belt may be determined from the wheel height sensor. For example, if a dolly is used, then there will be weight on the front wheels, otherwise the front wheels may dangle. Towing from the front with a tow strap may damage the vehicle, which can be assessed and logged.

Damage may also be assessed when the vehicle is towed and the parking break is engaged. If the parking brake sensor indicates that the parking brake is engaged while the vehicle is being towed, there are two conditions that may occur: (1) the rear wheels may turn and (2) the wheels may be locked. In the first case damage will be done to the brakes and in the second damage will be done to the tires, wheels and possibly suspension parts. The damage of these two conditions may be different. The transmission may also be damaged by towing the vehicle when it's not in neutral, therefore forcing the drivetrain to turn in reverse against the engine. With an automatic transmission, this turning is taken up by the transmission which will be damaged and with a manual it will be taken up by the engine which will be forced to motor backwards with low oil pressure. In the either case damage models can be built that consider the speed the vehicle is towed in gear and the duration to determine the cost. Towing faster than 65 mph with the rear wheels in contact with the road also damages the vehicle even when it's in neutral. When the vehicle is being towed for long distances, for example behind a mobile home, the engine should be started periodically (every 8 hours). The frequency at which the vehicle is restarted can be logged and is a factor in vehicle life. Towing the vehicle during the break-in period also reduces vehicle life and residual value. A damage model can extract the odometer reading to determine if the vehicle in the break-in period when towing begins. If it is it can log the duration of the towing event to determine damage.

Traction batteries in vehicles with electric drivetrains can be damaged by vibration, heat, cold, excessive charging and discharging rates and over/under charging. These factors can be used in a battery damage model to determine the state of health of the battery and the remaining life of the battery under different use conditions. For example, a traction battery may get damage from heat and be deep charge/discharge cycles in a location where there are hills, but still have adequate battery life for resale. If the vehicle is resold in an area where the terrain is flat, battery life may be less of an issue.

There is an oil change monitor that detects an oil change. Oil change frequency is an important determiner of internal combustion engine condition. Normal oil change frequencies follow a maintenance schedule, but certain conditions can cause oil to degrade more quickly than expected. For example, when a typical vehicle begins a cold start water-rich vapor passes by the still cold piston rings and fills the crankcase with condensate. After the vehicle warms, the condensate evaporates and leaves the engine. Vehicles that are driven infrequently on short trips never evaporate the condensate and it accumulates in the oil where it has a chance to react and for acids that reduce the oil viscosity and attack metal surfaces in the engine, causing accelerated wear of the engine. More frequent oil changes are needed to ensure normal engine life. Vehicle sensors can provide input to an engine wear model to determine; a) the optimal time between oil changes, and b) the actual time between changes. This can be used to predict the engine life.

Damage to vehicle interiors from outdoor exposure from the sun may be detected by the illumination sensor typically (but not always) located on the front dash board of a vehicle, the vehicle navigation system (including GPS sensor) and database, as well as off-board server that may track vehicle environment data. Ultra-violet light from the sun is known to oxidize paint on metal surfaces of the vehicle, reducing the life of the paint. It also damages and fades vehicle interiors. The extent of the damage depends on how long the vehicle is exposed, the intensity of the light and its angle of incidence to the vehicle surfaces. The direction of the sun with respect to the vehicle can be determined by the navigation system from the bearing of the vehicle, longitude, latitude, date and time it receives from the global positioning system using a well-known equation. The transmissivity of the atmosphere can be determined from weather data available on the internet cloud. The protection from the sun provided by trees, structures, etc. may be determined by satellite photos of the shade produced, the vehicle pyrometer, and the interior thermometer that determines the exposure from the heat of the vehicle. All the data can be combined into a model that predicts the life of the paint. People in sunny climates may be persuaded to park their cars in sheltered areas to avoid such damage once the monitored data indicates the type of damage such exposure has on the vehicle.

Exposure of a vehicle to salt water, particularly when the paint is damaged by chipping from material tossed up by the wheels, reduced the life of the vehicle by corroding the coating that protects the structural steel from salt water. The vehicle has a rain/snow detector that automatically turns on the windshield wipers in wet weather. If snow is detected by this sensor and by the traction control and anti-lock braking systems, it is known that the vehicle is driving in the snow and is likely accumulating salt on the surface. Salt water can also be detected using a very simple detector. The corrosion rate of steel is also very sensitive to ambient temperature which is measured using the ambient temperature sensor. Combining these inputs into a damage model can determine the rate of damage, which can be integrated over time to give total damage. To reduce such damage, the lessor may wash the vehicle after the car has been exposed to salt, and the vehicle can detect the car wash using the location from the navigation system, POI information from the navigation database (e.g. user sets and drives to a "Car Wash,"), the exposure of water from the rain detector/windshield sensor, and the ambient temperature.

In another embodiment, the vehicle computer system may be able to identify the customers who should be retained, targeted, or acquired based on driver habits. Based on all the detailed data the vehicle collected, mileages the driver has conducted on leased vehicles, automakers may identify certain customers to send marketing program offers or "early-bird" notification. For example, if automakers know how many mileages the customers drove per year or month, they could suggest the customers choose certain mileage enhancement program or not send them the "early bird" offer since the customers are not qualified for it due to driving the leased vehicle "beyond the limit." By tracking customer input information through the key fob, cellular phone paired with the vehicle computer system, VIN, etc., various embodiments may track this data.

The vehicle computer system may utilize the storage and large scale processing of damage models on clusters of commodity hardware (e.g. content delivery network) 608. This may allow for advanced processing that a typical vehicle computer system cannot handle. This may allow for various networks to share data or calculate data across different models.

The damages model may learn various methods applied to recalibrated damage assessment. The damage assessment may include information based on the warranty of the vehicle, extended warranty information, the lease vehicle rate or residual and other information. Thus, damage can be assessed particularly across each vehicle. Used car depreciation values may be obtained (e.g. Kelly Blue Book, actual resale prices, etc.) to be utilized in the model to update the drivers value.

The distributed database management system may aggregate large amounts of data 612 across many commodity servers (e.g. content delivery network). This will allow various entities (e.g. users, insurance, vehicle manufacturers, banks, etc.) have access to the data for various purposes. The data may then be shared to others in either a private or public setting. An end user analytics engine may provide information 614 needed to various individuals. The analytics engine may process the data for specific output. The data may be utilized to provide information needed to lessors, lessees, insurers, vehicle resellers, etc. For example, the data may be sent to a driver's insurer to allow the insurance company to know whether to raise/reduce premiums of that driver. In another embodiment, various users may receive the information to know the wear/tear on purchasing a used vehicle from a used vehicle website such as AUTOTRADER.COM.

Figure 7:
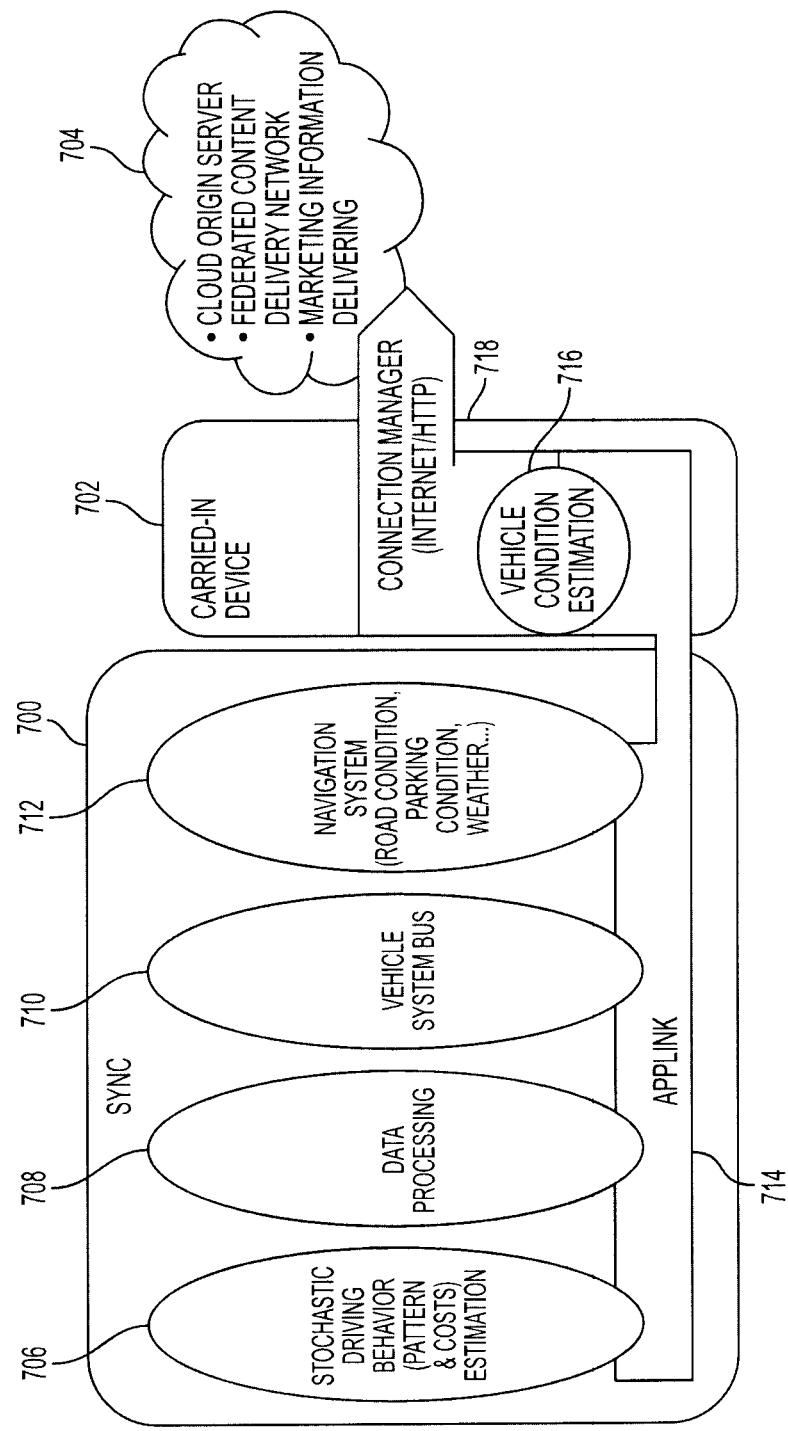
FIG. 7 is an illustrative embodiment that may utilize an application program interface between the vehicle computer system and nomadic device and off-board server.

FIG. 7 is an illustrative embodiment that may utilize an application program interface between the vehicle computer system and nomadic device and off-board server. The vehicle computer system 700 may interact with the nomadic device 702 to communicate information back and forth to one another. The nomadic device 702 may be utilized as a medium to communicate with the cloud 704.

The vehicle computer system (VCS) 700 may include software for monitoring stochastic driving behavior for (pattern & costs) estimation. It may utilize the various vehicle sensors to collect and determine this information. A data processing engine 708 may be included to process all information communicated throughout the vehicle computer system 700. The vehicle system bus 710 may be in communication with the VCS 700 to gather and collect all data from various sensors or other processors. The VCS 700 may also include a navigation system 712 that can monitor road condition, parking conditions, and weather conditions. The navigation system may also include various databases (e.g. GIS database, POI database, off-board database, traffic database, etc.) that could be utilized in receiving data for estimation.

The VCS may include an application program interface 714 such as FORD MOTOR COMPANY'S APPLINK. The application program interface (API) 714 may be utilized to facilitate communication to a nomadic device 702. A connection manager 718 may be utilized to communicate with the off-board server 704. The connection manage may send content via the Internet, REST, or message passing protocol. The API 714 helps facilitate all data collected by the VCS 700. The data may then be sent to an off-board server 704. The off-board server 704 may be a cloud origin server. The server 704 may be utilized as a federated content delivery network. Marketing information may be delivered from the cloud. Vehicle condition estimator 716 that is on the nomadic device 702 may be utilized to estimate the damages model of the vehicle or the wear-and-tear of various vehicle parts. The vehicle condition estimator 716 may interact with the API 714 and the connection manager 718.

The cloud server may be utilized to deliver content to the user. For example, marketing information may be sent from the cloud server to notify specific customers or various programs and offerings based on their individualized vehicle usage.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle computer system, comprising:
a processor in communication with a wireless transceiver and configured to:
1.) receive vehicle usage and performance data from one or more vehicle sensors;
2.) transmit, using the wireless transceiver, the vehicle usage and performance data to an off-board server configured to determine a vehicle depreciation in response to the usage and performance data;
3.) output the vehicle depreciation received from the server to a user display.

2. The vehicle computer system of claim 1, wherein the one or more vehicle sensors includes an engine control unit.

3. The vehicle computer system of claim 1, wherein the processor is further configured to receive vehicle environment data from a remote server via a mobile device in a communication with the wireless transceiver.

4. The vehicle computer system of claim 1, wherein vehicle environment data is utilized in determining the vehicle depreciation.

5. The vehicle computer system of claim 1, wherein vehicle information concerning the vehicle depreciation is sent to the user display via an e-mail or text message.

6. The vehicle computer system of claim 1, wherein the user display includes a mobile phone in the vehicle.

7. A server in communication with a vehicle, comprising:
a wireless transceiver at the server in communication with a vehicle configured to exchange data;
a processor at the server in communication with the wireless transceiver, the processor configured to:
1.) receive from the vehicle, vehicle data indicating vehicle usage and performance;
2.) receive vehicle environment data from a remote server;
3.) in response to the vehicle data and the vehicle environment data, transmit a depreciation value of the vehicle to a device to be output on a display.

8. The server of claim 7, wherein the processor is further configured to transmit a promotion to be output on a display based on the vehicle data.

9. The server of claim 7, wherein the wireless transceiver is further configured to exchange data via an application program interface in communication with a mobile device in the vehicle.

10. The server of claim 7, wherein the vehicle data includes vehicle data from an engine control unit.

11. The server of claim 7, wherein the processor is further configured to receive vehicle environment data from the remote server via a mobile device located in the vehicle in communication with the server in communication with the vehicle.

12. The server of claim 7, wherein vehicle environment data is utilized in a damages-model regarding the vehicle.

13. The server of claim 12, wherein the damages-model is utilized to assess a vehicle's depreciation value using at least the vehicle data and vehicle environment data.

14. The server of claim 7, wherein the vehicle includes one or more vehicle sensors that include an engine control unit.

15. The server of claim 7, wherein information concerning vehicle depreciation is sent to a third-party agency.

16. A computer-implemented method, comprising:
communicating with a mobile device located in a vehicle via a wireless transceiver;

receiving, via the mobile device communicating with an off-board server, vehicle usage and performance data from one or more vehicle sensors;

in response to the vehicle usage and performance data, outputting a depreciation value to a user device.

17. The computer-implemented method of claim 16, wherein the depreciation value is sent to a third-party agency.

18. The computer-implemented method of claim 16, wherein the method further includes the step of:

outputting, via the wireless transceiver, a recommended insurance offering to the user device in response to the depreciation value.

* * * * *